(12) United States Patent  (10) Patent No.: US 9,206,608 B2
Gevorgian  (45) Date of Patent: Dec. 8, 2015

(54) WALL LATH SECURING SYSTEM

(71) Applicant: Abraham Gevorgian, La Canada-Flintridge, CA (US)

(72) Inventor: Abraham Gevorgian, La Canada-Flintridge, CA (US)

( * ) Notice: Subject to any disclaimer, the term of this patent is extended or adjusted under 35 U.S.C. 154(b) by 84 days.

(21) Appl. No.: 14/078,416

(22) Filed: Nov. 12, 2013

(65) Prior Publication Data

US 2014/0190117 A1   Jul. 10, 2014

Related U.S. Application Data

(63) Continuation-in-part of application No. 13/113,308, filed on May 23, 2011, now abandoned.

(51) Int. Cl.
E04F 13/04 (2006.01)
F16B 15/02 (2006.01)
F16B 35/06 (2006.01)

(52) U.S. Cl.
CPC ............. *E04F 13/045* (2013.01); *F16B 15/02* (2013.01); *F16B 35/06* (2013.01)

(58) Field of Classification Search
USPC .......... 52/351, 349, 352, 356, 357, 359, 367, 52/454, 364, 361, 362, 680, 682; 248/74.5, 71, 51; 411/480, 482, 485; 174/541, 64, 40 CC, 44
See application file for complete search history.

(56) References Cited

U.S. PATENT DOCUMENTS

| 383,951 | A | * | 6/1888 | Hegbom | 52/677 |
|---|---|---|---|---|---|
| 644,938 | A | * | 3/1900 | Orr | 52/680 |
| 831,179 | A | * | 9/1906 | McDonagh | 16/4 |
| 975,310 | A | * | 11/1910 | Ybarrondo | 411/546 |
| RE14,075 | E | * | 2/1916 | Noetzel | 411/480 |
| 1,209,885 | A | * | 12/1916 | Rarey | 411/480 |
| 1,233,181 | A | * | 7/1917 | Burns | 248/74.5 |
| 1,541,360 | A | * | 6/1925 | Keas et al. | 52/681 |
| 1,573,069 | A | * | 2/1926 | Jensen | 52/680 |
| 1,610,082 | A | * | 12/1926 | Francis | 52/680 |
| 1,665,761 | A | * | 4/1928 | Voight | 52/682 |
| 1,703,560 | A | * | 2/1929 | Voight | 52/680 |
| 1,705,651 | A | * | 3/1929 | Thorpe | 52/682 |
| 1,729,721 | A | * | 10/1929 | Hogan | 248/498 |
| 1,767,565 | A | * | 6/1930 | Thrift et al. | 52/680 |
| 1,792,217 | A | * | 2/1931 | Farr | 52/680 |
| 1,816,387 | A | * | 7/1931 | Menninger | 52/363 |
| 2,010,578 | A | * | 8/1935 | Bank | 267/112 |
| 2,111,949 | A | * | 3/1938 | Stack | 52/683 |
| 2,258,574 | A | * | 10/1941 | Leary | 52/362 |
| 2,681,196 | A | * | 6/1954 | Lind | 248/71 |
| 2,825,949 | A | * | 3/1958 | Olsen | 52/714 |
| 2,906,060 | A | * | 9/1959 | Royden | 47/25.1 |
| 3,711,137 | A | * | 1/1973 | Tinnerman | 52/714 |
| 3,848,080 | A | * | 11/1974 | Schmidt | 174/164 |
| 4,370,082 | A | * | 1/1983 | Sundberg | 411/61 |
| 4,588,152 | A | * | 5/1986 | Ruehl et al. | 248/71 |
| 4,599,842 | A | * | 7/1986 | Counihan | 52/586.2 |

(Continued)

*Primary Examiner* — Robert Canfield
*Assistant Examiner* — Matthew Gitlin
(74) *Attorney, Agent, or Firm* — Plager Schack LLP

(57) ABSTRACT

A lath securing system is provided that is configured to durably retain wire lath in a spaced position from a wall that is to be coated, the system comprising a retaining member for retaining a section of wire lath therein to restrain the wire lath in a secure position; and a fastening member comprising rigid means for securing the retaining member to the wall so that when the retaining member is fastened to the wall, the section of wire lath within the retaining means is secured in a spaced position away from the wall so as to permit application of wall coating without significant movement of the wire lath.

3 Claims, 4 Drawing Sheets

(56) References Cited

U.S. PATENT DOCUMENTS

| | | | |
|---|---|---|---|
| 4,655,423 A * | 4/1987 | Schavilje et al. | 248/71 |
| 5,112,022 A * | 5/1992 | Cardas | 248/493 |
| 5,178,503 A * | 1/1993 | Losada | 411/441 |
| 5,301,907 A * | 4/1994 | Julian | 248/74.1 |
| 5,449,139 A * | 9/1995 | Herelier et al. | 248/300 |
| 5,513,935 A * | 5/1996 | Sharber et al. | 411/480 |
| 5,588,788 A * | 12/1996 | Dominguez | 411/482 |
| 5,755,545 A * | 5/1998 | Banks | 411/482 |
| D398,218 S * | 9/1998 | Coll et al. | D8/356 |
| 5,897,082 A * | 4/1999 | Losada | 248/65 |
| 6,035,595 A * | 3/2000 | Anderson | 52/363 |
| 6,062,789 A * | 5/2000 | Pope | 411/482 |
| 6,363,679 B1 * | 4/2002 | Rutherford | 52/681 |
| 6,668,501 B2 * | 12/2003 | Adebar et al. | 52/363 |
| 6,918,222 B2 * | 7/2005 | Lat et al. | 52/680 |
| 6,986,448 B2 * | 1/2006 | Lat et al. | 227/83 |
| 7,240,447 B2 * | 7/2007 | Humphrey | 40/740 |
| D564,345 S * | 3/2008 | Prada | D8/391 |
| 7,622,682 B2 * | 11/2009 | Malin | 174/135 |
| 7,895,803 B2 * | 3/2011 | Downey et al. | 52/511 |
| 8,336,275 B2 * | 12/2012 | Rodenhouse | 52/741.3 |
| 2004/0194422 A1 * | 10/2004 | Rodenhouse | 52/741.1 |
| 2004/0251392 A1 * | 12/2004 | Franks, Jr. | 248/497 |
| 2005/0053448 A1 * | 3/2005 | Lat et al. | 411/470 |
| 2010/0192495 A1 * | 8/2010 | Huff et al. | 52/302.1 |

* cited by examiner

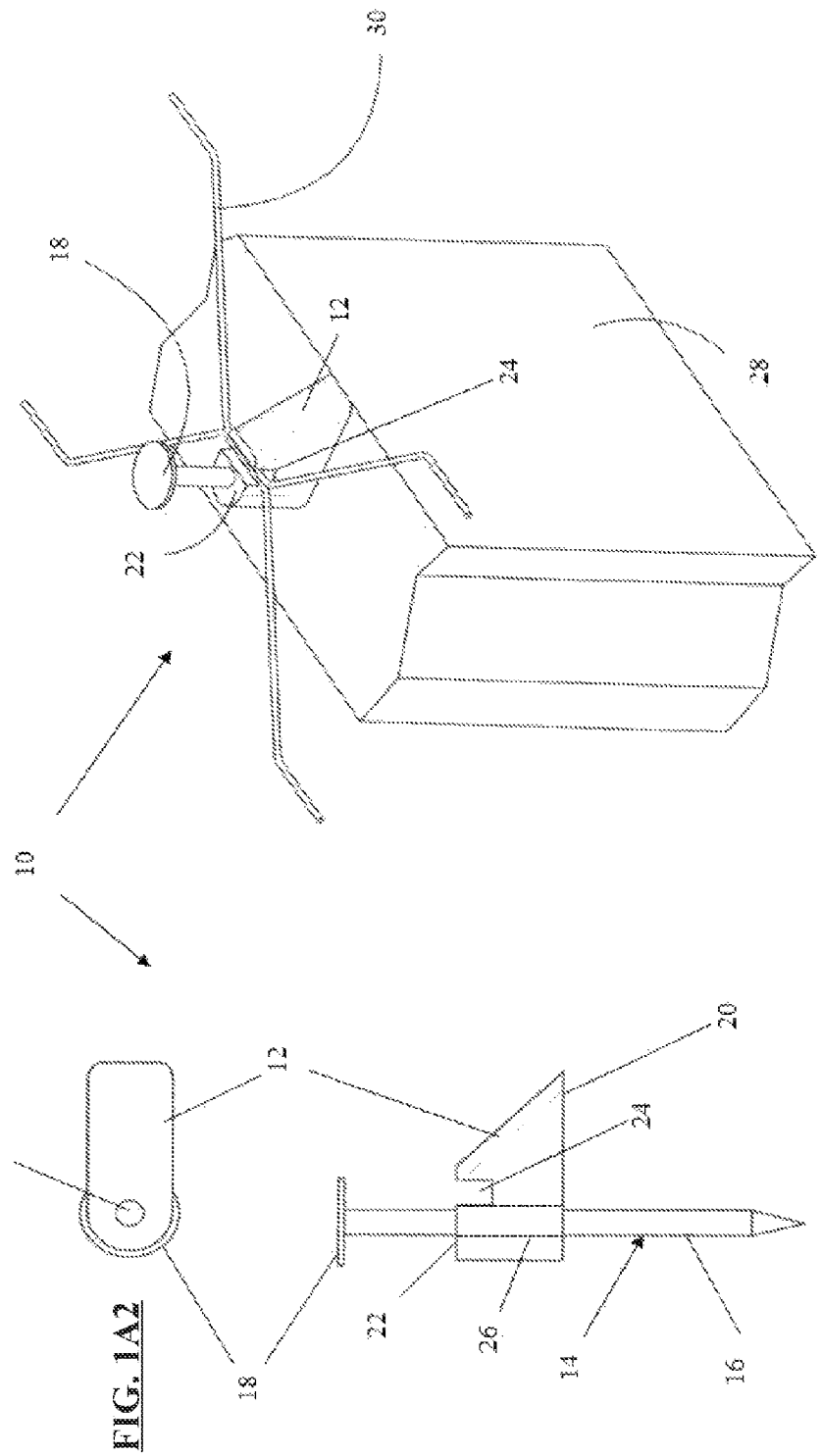

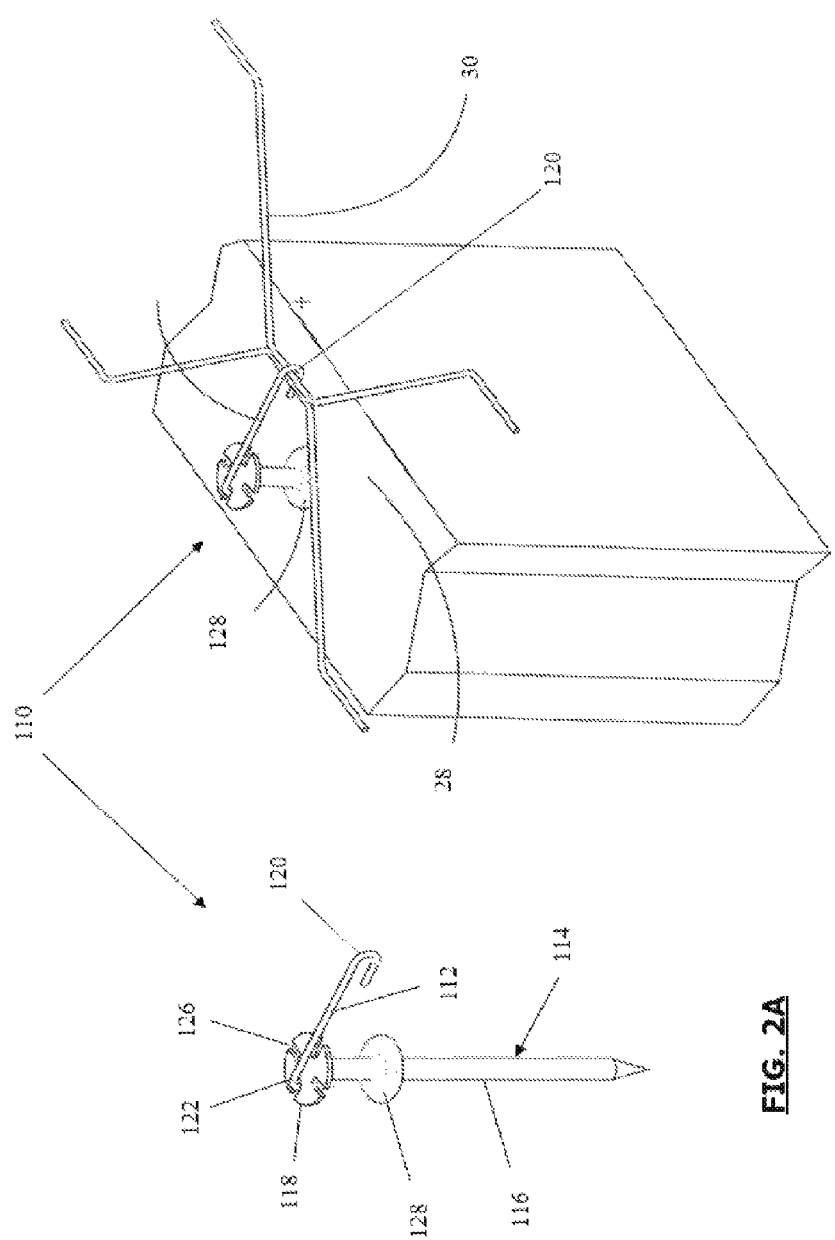

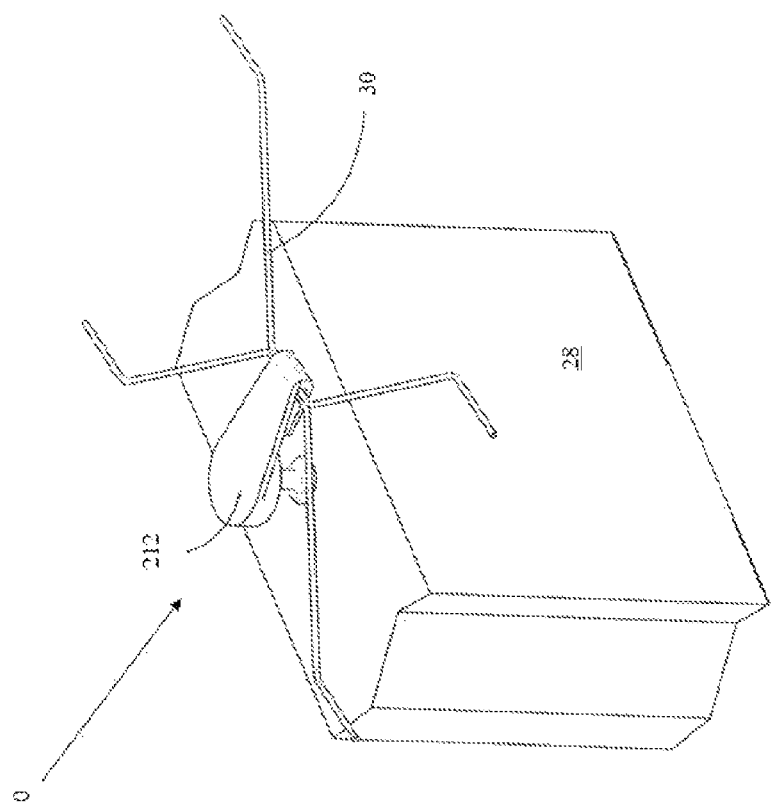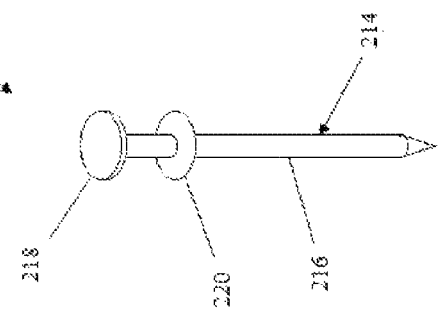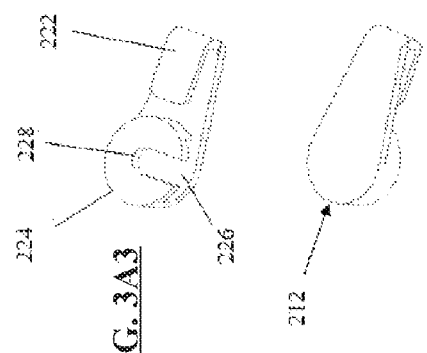

WALL LATH SECURING SYSTEM

RELATED APPLICATIONS

This continuation non-provisional application claims priority to non-provisional patent application U.S. Ser. No. 13/113,308 filed on May 23, 2011, the entire contents of which is herein incorporated by reference.

BACKGROUND

The embodiments herein relate generally to a system for improving the placement of wall coatings to a wall, and more specifically to a system for securing wire lath or the like to the wall prior to the application of coating.

In the construction of many building surfaces, it is desired to apply a durable coating other than paint to the surfaces, for both aesthetic and functional purposes. Such coatings include stucco and plaster, both of which are applied in a wet cement-like consistency. To enhance the durability of the coating and to assist in the efficiency of the application, wire lath is often used, upon which the coating is applied. To make the wire lath useful, it must be applied to the wall in a manner such that it remains spaced from the wall, so that the coating is applied so that it covers the wall and entirely envelops the wire lath. It is further desired that a sheet of protective material also be applied directly to the wall to help seal the interior of the building.

Numerous efforts have been made in the past to support the wire lath on the wall in a manner that it remains secure against movement during application of the coating, but is spaced evenly away from the wall. Most involve pre-formed wire clips that are nailed to the wall prior to the application of lath. Sheets of wire lath are then secured to the clips, usually by tie wire or the like. Channel pieces are also used to provide spaced support of the lath sheets on the wall.

The present invention presents an alternative array of embodiments that provide efficient and easy application of lath supports for use on a wall to be coated. At least some of the advantages of the embodiments of the present invention eliminate the need for double labor—that of applying the lath support to the wall, and that of tie wiring the lath to the lath support. Other advantages will be appreciated by the person of ordinary skill in the art from the description below.

SUMMARY

In embodiments of the present invention, a lath securing system is provided that is configured to durably retain wire lath in a spaced position from a wall that is to be coated with, for example, stucco or plaster. The system comprises generally a retaining member comprising means for retaining a section of wire lath therein to restrain the wire lath in a secure position, and a fastening member comprising rigid means for securing the retaining member to the wall. With this arrangement, when the retaining member is fastened to the wall, the section of wire lath within the retaining means is secured in a spaced position away from the wall so as to permit application of wall coating without significant movement of the wire lath.

In one embodiment, the lath securing system retaining member comprises a spacer support configured to rest against the wall. The retaining means comprises a detent in the spacer support within which the wire lath section may reside when the lath securing system is in place on a wall. In another embodiment, the retaining member comprises a clip that is configured to securely engage the fastening member. The retaining means comprises a first hook at one end of the clip within which the wire lath section may reside in a spaced position from the wall when the lath securing system is in place on said wall. In one variation, the fastening member comprises a nail comprising a tapered rod portion and a force-receiving head portion. The clip may comprise a wire comprising the first hook at one end and a second hook at the other end for engaging the nail. In yet further variations, the head of the nail comprises a plurality of slots within the head of the nail for receiving the second hook to secure the clip to the nail, so that when the system is in place on the wall, the first hook is secured to the wire lath section while the second hook of the clip is secured to the nail.

In yet another embodiment, the clip comprises a head-engaging means at a second end opposite the first end for engaging the head of the nail, so that when the system is in place on the wall, the first hook is secured to the wire lath section while the head-engaging means is secured to the nail. With such an arrangement, the head-engaging means may comprise a pocket within with the head of the nail may reside to engage the clip to the nail in secure fashion. Other embodiments are described in more detail below.

BRIEF DESCRIPTION OF THE FIGURES

The detailed description of some embodiments of the invention will be is made below with reference to the accompanying figures, wherein like numerals represent corresponding parts of the figures.

FIGS. 1A-1D show one embodiment of the present invention;

FIG. 1A1 shows a side view of one embodiment;

FIG. 1A2 shows a top view of one embodiment;

FIG. 1B showing a perspective view of the system applied to a wall;

FIG. 1C showing a side view of the system applied to a wall;

FIG. 1D showing a side view of a second embodiment of the system applied to a wall;

FIGS. 2A-2B show another embodiment of the present invention, with FIG. 2A showing a perspective view of the system and FIG. 2B showing a perspective view of the system as applied to a wall;

FIGS. 3A1-3B show yet another embodiment of the present invention;

FIG. 3A1 shows the underside view of another embodiment;

FIG. 3A2 shows the top view of the another embodiment;

FIG. 3B showing a perspective view of the system as applied to a wall.

DETAILED DESCRIPTION OF CERTAIN EMBODIMENTS

Figure 1C:
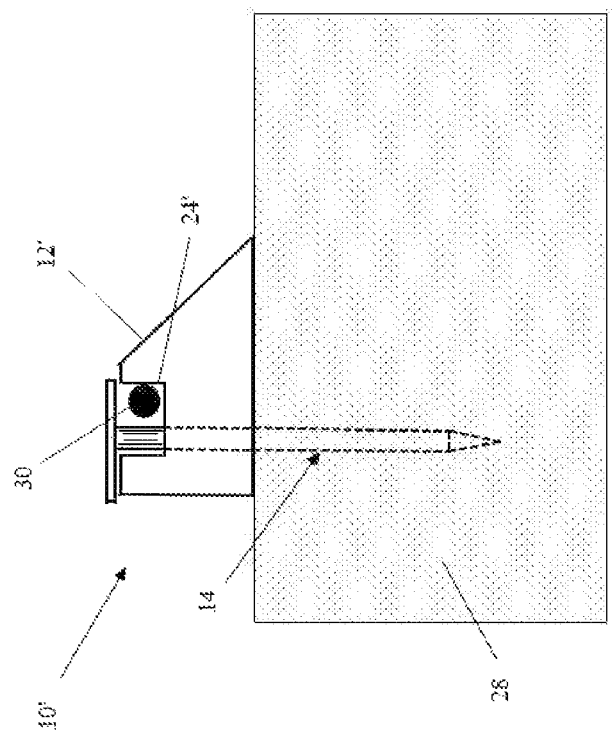

By way of example, and referring to FIGS. 1A-1C one embodiment of lath securing system 10 comprises a retaining member and a fastening member for securing the system 10 to a wall. The retaining member comprises a spacer support 12 configured to rest against the wall. The fastening member comprises a fastening nail 14 comprising a nail rod portion 16 and a nail head portion 18. The nail rod portion 16 comprises a tapered end so that blunt force may be applied to nail head portion 18 to drive the fastening member 14 into a wall.

The spacer support 12 comprises a first surface 20 for abutting a wall surface, and a second surface 22 comprising a retaining means, which in this embodiment is a detent 24 for receiving a portion of wire lath therein in a secure fashion. The spacer support 12 further comprises a bore 26 for accepting the fastening nail 14 therethrough, where the bore is preferably large enough to permit smooth passage of the nail 14 but small enough to eliminate too much movement of the spacer support 12 relative to the nail. A snug fit may be desired, and it is even contemplated that the bore 26 have an internal diameter smaller than the diameter of the nail rod 16 to create a friction fit.

Referring to FIG. 1B, this embodiment example of lath securing system 10 may be seen applied to a wall 28 with a portion of wire lath 30 secured therein. Specifically, the spacer support 12 is applied to wall 28 in a position whereby a portion of the wire lath 30 may rest securely within detent 24 on second support surface 22. Fastening nail 14 can be driven forcefully through bore 26 of spacer support 12 and into wall 28 by applying a force on nail head 18. Importantly, as can be seen from FIG. 1C, when the system 10 is applied to wall 28 such that the fastener nail 14 is driven completely through the spacer support 12 and into the wall, the nail head 18 of nail 14 encloses the portion of wire lath 30 residing within detent 24 of spacer support 12 so that the wire lath 30 is locked in place, spaced sufficiently from the wall for coating with stucco or plaster. With this configuration, a user may place a plurality of wall lath securing systems 10 against a wall so positioned so that portions of the wire lath are secured with the detent 24 of each spacer support 12 to securely support an entire wire lath system in spaced fashion against the wall 28.

The spacer support 12 may be made of any durable material, such as plastic, metal or wood, but preferably should be able to withstand years embedded within the wall coating under the ambient elements associated with that particular geography. Likewise, the fastening nail should be made of material that can withstand blunt forces to drive it into a wall, preferably metal, but any material suitable to that function is contemplated.

Figure 1D:
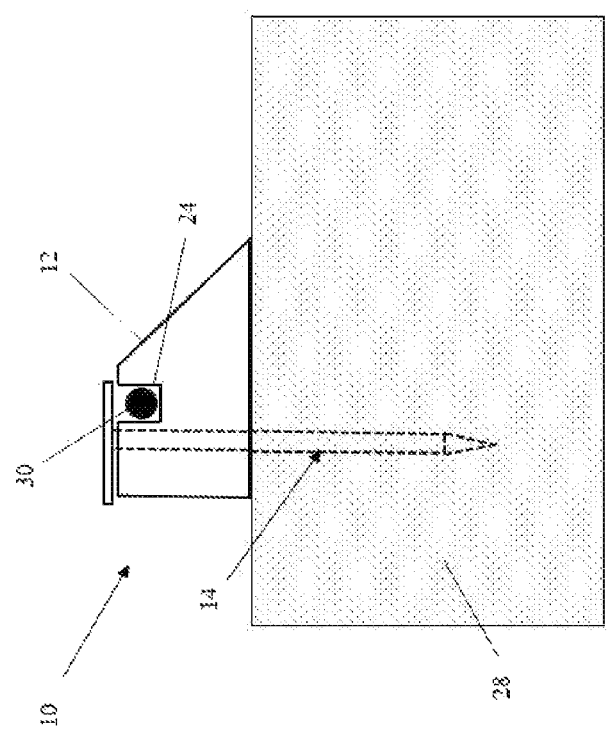

The size of the spacer support 12, i.e., the distance between the first and second surfaces, 20, 22, as well as the depth of the detent 24, may be as large or small as needed to reflect the desired spacing of the lath 30 from the wall 28. In an alternative embodiment, such as that shown in FIG. 1D, a spacer support 12' comprises a detent 24' of larger dimension such that a portion of nail 14 is exposed within the detent 24' rather than driven through a portion of the spacer support immediately adjacent the detent 24 such as that shown in FIG. 1C.

It may also be desired to have an entire set of spacer supports 12 be the same overall dimension, but have subsets with detents 24 of varied depths, depending upon whether some walls should have the lath spaced further from or closer to the wall. Although not conventionally employed, were it desired to layer the wall with two sheets of wire lath, it is contemplated that a space support be provided comprising two detents, each with differing depths, so that a first layer of wire lath be applied at a first level and a second layer be applied at a second level spaced farther from the wall. Indeed, a single detent with two different-height interior shoulders could be provided to accommodate the same lath layering technique.

Numerous other embodiments are contemplated for the present invention. For example, referring to FIGS. 2A and 2B, an alternative embodiment of lath securing system 110 includes a retaining member comprising a clip 112 and a fastening member comprising a dual-headed nail 114. Similar to the fastening nail 14 of the embodiment of FIGS. 1A-1C, fastening nail 114 comprises a nail rod portion 116 and nail head portion 118. Retaining clip 112 comprises a rod-like structure having a first hook 120 at a first end, and a second hook 122 at a second end. The second hook 112 is configured to engage one of a plurality of slots 126 in the nail head portion 118 of fastening nail 114.

Notably, fastening nail 114 includes an optional second head 128 similar to common duplex nails. One of the functions of the second head 128 is to provide a guide to the user of how far to advance the fastening nail 114 into the wall to leave the desired spacing from the wall 28 for the wire lath 30. It should be appreciated, however, that fastening nail 114 may be driven into wall 28 using a powered hammer, such as a pneumatic gun. In some cases, pneumatic guns and other types of powered hammers include the capability to set the depth to which a nail is driven. In such cases, the optional second head 128 may not be needed or desired.

Referring to FIG. 2B specifically, the system 110 may be installed by first driving a plurality of fastening nails 114 into wall 28 at a desired locations. The wire lath 30 may then be applied in a manner where the retaining member clip 112 may be readily hooked to the wire lath 30 to restrain movement of the wire lath 30 in spaced position from the wall 28. The desired spacing of the lath 30 from the wall 28 depends upon the position of the second head 128 on the fastening nail 114. If desired, a set of fastening nails 114 may include subsets with second heads 128 positioned in varied positions on the rod portion 116 so that subsets may be selected depending upon the desired wire lath spacing from the wall.

If desired, the second hook 122, may be permanently affixed to a slot 126 in the nail head portion 118, or may be provided as a discrete system component to be attached to whichever slot is most convenient after the fastening nail 114 is affixed to the wall 28. Having the clip 112 adhered to the nail head portion 118 eliminates a separate step of attaching the clip 112 to the fastening nail 114 during system installation, but it restricts the ability to apply the fastening nail 114 to the wall 28 without regard to orientation. Even if maximum flexibility is desired by keeping the clip 112 as a discrete component to be attached later, the configuration of clip 112 is such that it makes for a very easy and quick attachment to the nail head portion 118 and wire lath 30 during installation that is easier and quicker than tie wiring. Regardless, both versions are contemplated depending upon the user's desires.

The clip 112 may be made of any durable material, such as plastic or metal, but preferably should be able to withstand years embedded within the wall coating under the ambient elements associated with that particular geography. Likewise, the fastening nail should be made of material that can withstand blunt forces to drive it into a wall, preferably metal, but any material suitable to that function is contemplated. The fastening nail should also be made to withstand the shear forces associated with the wire lath pulling laterally on the nail head portion 118.

Other alternative embodiments include, for example, the system shown in FIGS. 3A1, 3A2 and 3B. In that regard, lath securing system 210 includes a retaining member comprising a clip 212 and a fastening member comprising a duplex-style nail 214 configured to restrain and support sheets of wire lath 30 in spaced relationship against a wall 28. Referring to FIG. 3A specifically, fastening nail 214 comprises a rod portion 216 and a head portion 218. It further comprises a second head 220 positioned below the head portion 218. As with the fastening nail 114 of the embodiment of FIGS. 2A and 2B, the nail 214 has a second head 220 to space the head portion 218 from the wall 28. It may resemble a standard duplex nail or may be configured differently if so desired. Indeed, the fastening nails 114 and 214 need not necessarily have a second head, but it does provide the advantage of uniform spacing of the wire lath from the wall without the user needing to visually make that determination when driving the nail into the wall. However, as described above, a powered hammer device such as a pneumatic gun with the capability to control the depth to which the nail is driven may eliminate the need for the second head 220.

With this example embodiment, the retaining clip 212 comprises a first hook 222 at a first end of the clip and a second hook 224 at a second end. As with the retaining member of the embodiment of FIGS. 2A and 2B, the opposing hooks are preferably configured to engage the nail head portion and the wire lath in retrained format. Retaining member 212 is exemplary of a non-wire configuration, however. Indeed, it reflects one of a number of possible configurations for a clip to secure the wire lath at one end to a fastening member at the other end. The second hook 224 may have one of a number of configurations specifically, provided they serve some ability to grasp the head portion 218 of the fastening nail 214 in a manner that restrains significant relative movement of the wire lath relative to the wall and lath securing system 210. In one arrangement, second hook 224 comprises a pocket 226 configured to receive the nail head 218 therewithin with little room for movement. The pocket 226 includes a nail slot 228 to permit the rod portion 216 of fastening nail 214 to slide toward the inside of the pocket.

If desired, the pocket 226 may be secured to the fastening nail 214 prior to applying the nail to the wall 28, or afterwards. The retaining clip 212 should be made of sturdy material that can withstand the elements, as with the above-described embodiments, but may also be made of material sufficient to withstand the blunt force needed to drive the fastening nail into wall. That is optional, of course, if it is desired to drive the nail into the wall first and then later apply the clip 212 to the head portion 218 of the fastening nail 214. The first hook 222 may then be secured to a portion of the sheet of lath for securement as described above.

Each of the embodiments described herein are illustrations of examples of the present invention and are not intended to restrict the scope of protection afforded the invention. A person of ordinary skill in the art should appreciate that variations in the configuration and materials are contemplated by the present invention without limitation to the specific embodiments presented. In that regard, the scope of protection should be assessed based upon the appropriate construction of the claims as set forth below.

What is claimed is:

1. A lath securing system configured to durably retain wire lath in a spaced position from a wall that is to be coated with stucco or plaster, the system comprising:

a rigid fastening member comprising a first end, a second end, and a spacer therebetween, the first end comprises a tapered end configured for attachment to the wall, the second end comprises a generally flat head, and the spacer comprises a radially extending ridge configured to prevent the head from coming into contact with the wall at a predefined distance; and a clip comprising a first end comprising a generally U-shaped hook with a return, wherein the return portion projects inwardly toward the rigid fastening member configured to accept and secure wire lath therein and preventing slippage of the lath from within the hook and a second end opposite the first end comprising a pocket and a nail slot engaging the head of the rigid fastening member, so that when the system is in place on the wall, the first end of the clip is secured to the wire lath while the second end of the clip is secured to the rigid fastening member at the predefined distance from the wall.

2. The lath securing system of claim 1, wherein the second end of the clip comprises a pocket wherein the head of the rigid fastening member may reside to engage the clip to the rigid fastening member in a secure fashion.

3. The lath securing system of claim 1, wherein the rigid fastening member may be selected from a group comprising a self-tapping screw and a nail.

\* \* \* \* \*